United States Patent [19]

Ishii

[11] E Patent Number: Re. 33,532

[45] Reissued Date of Patent: Feb. 5, 1991

[54] DISPLAY CONTROL SYSTEM WHICH PRODUCES VARYING PATTERNS TO REDUCE FLICKERING

[75] Inventor: Takatoshi Ishii, Tokyo, Japan

[73] Assignee: Ascii Corporation, Tokyo, Japan

[21] Appl. No.: 480,632

[22] Filed: Feb. 15, 1990

Related U.S. Patent Documents

Reissue of:

[64] Patent No.: 4,827,255
Issued: May 2, 1989
Appl. No.: 868,673
Filed: May 30, 1986

[30] Foreign Application Priority Data

May 31, 1985 [JP] Japan ..... 60-118096
Jul. 15, 1985 [JP] Japan ..... 60-156705
Jul. 15, 1985 [JP] Japan ..... 60-156706

[51] Int. Cl.[5] ..... G09G 1/14
[52] U.S. Cl. ..... 340/793; 340/703
[58] Field of Search ..... 340/701, 703, 793; 358/11, 81

[56] References Cited

U.S. PATENT DOCUMENTS 4,158,200 6/1979 Seitz et al. ..... 340/793
4,251,755 2/1981 Bryden ..... 340/793
4,481,529 11/1984 Kerling ..... 340/793

*Primary Examiner*—Jeffery A. Brier
*Assistant Examiner*—Richard Hjerpe
*Attorney, Agent, or Firm*—Cushman, Darby & Cushman

[57] ABSTRACT

A display control system has a digital interface therein. When software using a color display is executed and displayed in a monochrome monitor, this system is responsive to color code information to arbitrarily select either a hatching pattern conversion or a grey scale display according to application software or the like. The system can thus discriminate the display contents thereof.

In a color monitor that permits input of a plurality of digital signals, the display control system can convert a given piece of color code information into digital video signals according to frames and display positions in a given area of a display screen for display of natural colors. In a monochrome monitor capable of displaying video and high-intensity brightness signals, the display control system not only converts a given piece of color code information into digital video signals according to frames and display positions in a given area of a display screen, but also outputs digital video signals in a plurality of bits according to a piece of color code information, so as to display more gradations of the color code.

19 Claims, 8 Drawing Sheets

FIG. 3

CODE CONVERSION TABLE

| COLOR CODE INFORMATION (CC3~0) | LINE COUNT SIGNAL (LC0) | FRAME COUNT SIGNAL (FC2~0) 0 | | 1 | | 2 | | 3 | | 4 | | 5 | | 6 | | 7 | | DOT COUNT SIGNAL (DCO) | DISPLAY PATTERN | BRIGHTNESS LEVEL |
|---|---|---|---|---|---|---|---|---|---|---|---|---|---|---|---|---|---|---|---|---|
| | | 0 | 1 | 0 | 1 | 0 | 1 | 0 | 1 | 0 | 1 | 0 | 1 | 0 | 1 | 0 | 1 | | | |
| 0 | 0 | 0 | 0 | | | | | | | | | | | | | | | | 0 | 0 |
| | 1 | 0 | 0 | | | | | | | | | | | | | | | | | |
| 1 | 0 | 0 | 0 | 0 | 0 | 0 | 0 | 0 | 1 | 0 | 0 | 0 | 0 | 0 | 0 | 1 | 0 | | 1/8 | 1 |
| | 1 | 0 | 0 | 0 | 0 | 0 | 0 | 1 | 0 | 0 | 0 | 0 | 0 | 0 | 0 | 0 | 1 | | | |
| 2 | 0 | 0 | 0 | 1 | 0 | 0 | 0 | 0 | 1 | | | | | | | | | | 1/4 | 2 |
| | 1 | 0 | 0 | 0 | 1 | 0 | 0 | 1 | 0 | | | | | | | | | | | |
| 3 | 0 | 0 | 1 | 1 | 0 | 0 | 1 | 0 | 0 | 1 | 0 | 0 | 1 | 1 | 0 | 0 | 0 | | 3/8 | 3 |
| | 1 | 1 | 0 | 0 | 1 | 1 | 0 | 0 | 0 | 0 | 1 | 1 | 0 | 0 | 1 | 0 | 0 | | | |
| 4 | 0 | 0 | 1 | 1 | 0 | | | | | | | | | | | | | | 1/2 | 4 |
| | 1 | 1 | 0 | 0 | 1 | | | | | | | | | | | | | | | |
| 5 | 0 | 0 | 1 | 1 | 0 | 0 | 1 | 1 | 1 | 1 | 0 | 0 | 1 | 1 | 0 | 1 | 1 | | 5/8 | 5 |
| | 1 | 1 | 0 | 0 | 1 | 1 | 0 | 1 | 1 | 0 | 1 | 1 | 0 | 0 | 1 | 1 | 1 | | | |
| 6 | 0 | 1 | 1 | 1 | 0 | 1 | 1 | 0 | 1 | | | | | | | | | | 3/4 | 6 |
| | 1 | 1 | 1 | 0 | 1 | 1 | 1 | 1 | 0 | | | | | | | | | | | |
| 7 | 0 | 1 | 1 | | | | | | | | | | | | | | | | 1 | 8 |
| | 1 | 1 | 1 | | | | | | | | | | | | | | | | | |
| 8 | 0 | 0 | 1 | | | | | | | | | | | | | | | | 0 1 / 0 0 | 2 |
| | 1 | 0 | 0 | | | | | | | | | | | | | | | | | |
| 9 | 0 | 0 | 1 | | | | | | | | | | | | | | | | 0 1 / 1 0 | 4 |
| | 1 | 1 | 0 | | | | | | | | | | | | | | | | | |
| A | 0 | 0 | 1 | | | | | | | | | | | | | | | | 0 1 / 0 1 | 4 |
| | 1 | 0 | 1 | | | | | | | | | | | | | | | | | |
| B | 0 | 1 | 1 | | | | | | | | | | | | | | | | 1 1 / 0 0 | 4 |
| | 1 | 0 | 0 | | | | | | | | | | | | | | | | | |
| C | 0 | 1 | 1 | | | | | | | | | | | | | | | | 1 1 / 0 1 | 6 |
| | 1 | 0 | 1 | | | | | | | | | | | | | | | | | |
| D | 0 | 0 | 1 | 0 | 0 | | | | | | | | | | | | | | 0 ½ / ½ 0 | 2 |
| | 1 | 0 | 0 | 1 | 0 | | | | | | | | | | | | | | | |
| E | 0 | 0 | 1 | 0 | 0 | | | | | | | | | | | | | | 0 ½ / ½ 1 | 4 |
| | 1 | 0 | 1 | 1 | 1 | | | | | | | | | | | | | | | |
| F | 0 | 1 | 1 | 1 | 0 | | | | | | | | | | | | | | 1 ½ / ½ 1 | 6 |
| | 1 | 0 | 1 | 1 | 1 | | | | | | | | | | | | | | | |

FIG. 7(1) CODE CONVERSION TABLE

DOT COUNT SIGNAL (DCO)

| COLOR CODE INFORMATION (CC4~0) | LINE COUNT SIGNAL (LCO) | FRAME COUNT SIGNAL (FC2~0) 0 | 1 | 2 | 3 | 4 | 5 | 6 | 7 | DISPLAY PATTERN | BRIGHTNESS LEVEL |
|---|---|---|---|---|---|---|---|---|---|---|---|
| | | 0 1 | 0 1 | 0 1 | 0 1 | 0 1 | 0 1 | 0 1 | 0 1 | | |
| 00 | 0 | 0 0 | | | | | | | | 0 | 0 |
| | 1 | 0 0 | | | | | | | | | |
| 01 | 0 | 0 0 | 0 0 | 0 0 | 0 1 | 0 0 | 0 0 | 0 0 | 1 0 | 1/8 | 1 |
| | 1 | 0 0 | 0 0 | 0 0 | 1 0 | 0 0 | 0 0 | 0 0 | 0 1 | | |
| 02 | 0 | 0 0 | 1 0 | 0 0 | 0 1 | | | | | 1/4 | 2 |
| | 1 | 0 0 | 0 1 | 0 0 | 1 0 | | | | | | |
| 03 | 0 | 0 1 | 1 0 | 0 1 | 0 0 | 1 0 | 0 1 | 1 0 | 0 0 | 3/8 | 3 |
| | 1 | 1 0 | 0 1 | 1 0 | 0 0 | 0 1 | 1 0 | 0 1 | 0 0 | | |
| 04 | 0 | 0 1 | 1 0 | | | | | | | 1/2 | 4 |
| | 1 | 1 0 | 0 1 | | | | | | | | |
| 05 | 0 | 0 1 | 1 0 | 0 1 | 1 1 | 1 0 | 0 1 | 1 0 | 1 1 | 5/8 | 5 |
| | 1 | 1 0 | 0 1 | 1 0 | 1 1 | 0 1 | 1 0 | 0 1 | 1 1 | | |
| 06 | 0 | 1 1 | 1 0 | 1 1 | 0 1 | | | | | 3/4 | 6 |
| | 1 | 1 1 | 0 1 | 1 1 | 1 0 | | | | | | |
| 07 | 0 | 1 1 | | | | | | | | 1 | 8 |
| | 1 | 1 1 | | | | | | | | | |
| 08 | 0 | 0 1 | | | | | | | | 0 1 / 0 0 | 2 |
| | 1 | 0 0 | | | | | | | | | |
| 09 | 0 | 0 1 | | | | | | | | 0 1 / 1 0 | 4 |
| | 1 | 1 0 | | | | | | | | | |
| 0A | 0 | 0 1 | | | | | | | | 0 1 / 0 1 | 4 |
| | 1 | 0 1 | | | | | | | | | |
| 0B | 0 | 1 1 | | | | | | | | 1 1 / 0 0 | 4 |
| | 1 | 0 0 | | | | | | | | | |
| 0C | 0 | 1 1 | | | | | | | | 1 1 / 0 1 | 6 |
| | 1 | 0 1 | | | | | | | | | |
| 0D | 0 | 0 1 | 0 0 | | | | | | | 0 1/2 / 1/2 0 | 2 |
| | 1 | 0 0 | 1 0 | | | | | | | | |
| 0E | 0 | 0 1 | 0 0 | | | | | | | 0 1/2 / 1/2 1 | 4 |
| | 1 | 0 1 | 1 1 | | | | | | | | |
| 0F | 0 | 1 1 | 1 0 | | | | | | | 1 1/2 / 1/2 1 | 6 |
| | 1 | 0 1 | 1 1 | | | | | | | | |

FIG. 7 (2) CODE CONVERSION TABLE

DOT COUNT SIGNAL (DCO)

| COLOR CODE INFORMATION (CC4~0) | LINE COUNT SIGNAL (LCO) | FRAME COUNT SIGNAL (FC 2~0) 0 | | 1 | | 2 | | 3 | | 4 | | 5 | | 6 | | 7 | | DISPLAY PATTERN | BRIGHTNESS LEVEL |
|---|---|---|---|---|---|---|---|---|---|---|---|---|---|---|---|---|---|---|---|
| | | 0 | 1 | 0 | 1 | 0 | 1 | 0 | 1 | 0 | 1 | 0 | 1 | 0 | 1 | 0 | 1 | | |
| 10 | 0 | 0 | 3 | | | | | | | | | | | | | | | 0 2 / 2 0 | 8 |
| | 1 | 3 | 0 | | | | | | | | | | | | | | | | |
| 11 | 0 | 1 | 1 | 1 | 1 | 1 | 1 | 1 | 3 | 1 | 1 | 1 | 1 | 1 | 1 | 3 | 1 | 9/8 | 9 |
| | 1 | 1 | 1 | 1 | 1 | 1 | 1 | 3 | 1 | 1 | 1 | 1 | 1 | 1 | 1 | 1 | 3 | | |
| 12 | 0 | 1 | 1 | 3 | 1 | 1 | 1 | 1 | 3 | | | | | | | | | 5/4 | 10 |
| | 1 | 1 | 1 | 1 | 3 | 1 | 1 | 3 | 1 | | | | | | | | | | |
| 13 | 0 | 1 | 3 | 3 | 1 | 1 | 3 | 1 | 1 | 3 | 1 | 1 | 3 | 3 | 1 | 1 | 1 | 11/8 | 11 |
| | 1 | 3 | 1 | 1 | 3 | 3 | 1 | 1 | 1 | 1 | 3 | 3 | 1 | 1 | 3 | 1 | 1 | | |
| 14 | 0 | 1 | 3 | 3 | 1 | | | | | | | | | | | | | 3/2 | 12 |
| | 1 | 3 | 1 | 1 | 3 | | | | | | | | | | | | | | |
| 15 | 0 | 1 | 3 | 3 | 1 | 1 | 3 | 3 | 3 | 3 | 1 | 1 | 3 | 3 | 1 | 3 | 3 | 13/8 | 13 |
| | 1 | 3 | 1 | 1 | 3 | 3 | 1 | 3 | 3 | 1 | 3 | 3 | 1 | 1 | 3 | 3 | 3 | | |
| 16 | 0 | 3 | 3 | 3 | 1 | 3 | 3 | 1 | 3 | | | | | | | | | 7/4 | 14 |
| | 1 | 3 | 3 | 1 | 3 | 3 | 3 | 3 | 1 | | | | | | | | | | |
| 17 | 0 | 3 | 3 | | | | | | | | | | | | | | | 2 | 16 |
| | 1 | 3 | 3 | | | | | | | | | | | | | | | | |
| 18 | 0 | 1 | 3 | | | | | | | | | | | | | | | 1 2 / 1 1 | 10 |
| | 1 | 1 | 1 | | | | | | | | | | | | | | | | |
| 19 | 0 | 1 | 3 | | | | | | | | | | | | | | | 1 2 / 2 1 | 12 |
| | 1 | 3 | 1 | | | | | | | | | | | | | | | | |
| 1A | 0 | 1 | 3 | | | | | | | | | | | | | | | 1 2 / 1 2 | 12 |
| | 1 | 1 | 3 | | | | | | | | | | | | | | | | |
| 1B | 0 | 3 | 3 | | | | | | | | | | | | | | | 2 2 / 1 1 | 12 |
| | 1 | 1 | 1 | | | | | | | | | | | | | | | | |
| 1C | 0 | 3 | 3 | | | | | | | | | | | | | | | 2 2 / 1 2 | 14 |
| | 1 | 1 | 3 | | | | | | | | | | | | | | | | |
| 1D | 0 | 1 | 3 | 1 | 1 | | | | | | | | | | | | | 1 ½ / ½ 1 | 10 |
| | 1 | 1 | 1 | 3 | 1 | | | | | | | | | | | | | | |
| 1E | 0 | 1 | 3 | 1 | 1 | | | | | | | | | | | | | 1 ½ / ½ 2 | 12 |
| | 1 | 1 | 3 | 3 | 3 | | | | | | | | | | | | | | |
| 1F | 0 | 3 | 3 | 3 | 1 | | | | | | | | | | | | | 2 ½ / ½ 2 | 14 |
| | 1 | 1 | 3 | 3 | 3 | | | | | | | | | | | | | | |

DISPLAY CONTROL SYSTEM WHICH PRODUCES VARYING PATTERNS TO REDUCE FLICKERING

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a display control system having a digital interface.

2. Description of the Prior Art

Systems employing monochrome or color monitors include two kinds of display control systems; one is a display control system having an analog interface, and the other is a display control system with a digital interface.

In either of the above-mentioned display control systems, generally monochrome monitor systems, employing a CRT or liquid crystal, are less expensive than color monitor system. For this reason, the monochrome monitor exists in larger numbers at the present. However, since the color monitor system has also been spreading gradually, software utilizing color display has recently appeared on the market in great numbers.

On the other hand, there are available panel displays which use a liquid crystal, electro-luminescence (EL), plasma or the like. Such panel displays are expected to spread in the future as display devices for hand-held and portable computers. Such panel displays as now used, display only a single color.

In the display system having a digital interface, when software which is intended for a color display may be executed on a conventional system which employs the monochrome monitor. This causes a problem that the display of the software can not be distinguished. This is because the conventional system employing the monochrome monitor can only display in black and white and is incapable of carrying out a color discrimination.

Also, most of the panel displays have a short time of afterglow. Thus, in such panel displays, when a half-brightness display is carried out, there arises a problem that striking flickers are caused to appear.

Furthermore, among the color monitors employed in the display system having digital interface, the color monitors which input a plurality of digital signals are arranged to display only colors that are quite different from natural colors. For example, the color monitor inputting 3 digital signals R, G, B can display only 8 colors, but is unable to display natural colors which are formed by mixing of the RGB.

In addition, in the display systems provided with a digital interface, there is provided a monochrome monitor which is capable of displaying video signals and high-intensity brightness signals (or half-brightness signals). In such a monochrome monitor, a high-intensity brightness white can be displayed in addition to white and black. However, since such a monochrome monitor can display only these three colors and thus four or more colors cannot be displayed by such monitor, it is disadvantageous in that it is not applicable to such a gradation display that includes four or more colors.

SUMMARY OF THE INVENTION

The present invention aims at eliminating the drawbacks found in the above-mentioned prior art systems.

Accordingly, it is an object of the invention to provide a display control system in a display system having a digital interface therein. When software using a color display is executed and is then displayed on a monochrome monitor, this system is capable of distinguishing the display contents thereof, as well as reducing the appearance of unfavorable flickers to a minimum.

It is another object of the invention to provide a display control system which is capable of displaying such color that are closer to natural colors in a color monitor inputting a plurality of digital signals.

It is still another object of the invention to provide a display control system which is capable of displaying a greater number of gradations in a monochrome monitor, capable of displaying video and high-intensity brightness signals.

In attaining the above objects, according to one aspect of the invention, there is provided a display control system having digital interface which is capable of arbitrarily selecting either a conversion to hatching pattern or a grey scale display (brightness control by thinning out each frame) correspondingly to color code information according to application software, display devices used and user's taste, whereby when software using a color display is executed and displayed in a monochrome monitor the display contents thereof can be distinguished from one another.

According to another aspect of the invention, there is provided a color monitor adapted to receive a plurality of digital signals in which, in order to be able to display natural colors, there are provided a plurality of digital video signal conversion means for converting a given piece of color code information into a digital video signal corresponding to the frame and display position thereof in a given region of a display screen.

According to still another aspect of the invention, there is provided a monochrome monitor capable of displaying video signals and high brightness signals, which, in order to be able to display a greater number of gradation, is provided with digital video signal conversion means for converting a given piece of color code information into a digital video signal corresponding to the frame and display position thereof in a given region of a display screen to thereby output a plurality of bits for the above digital video signal in accordance with one piece of such color code information.

The above and other related objects and aspects of the invention will be apparent from a reading of the following description of the disclosure found in the accompanying drawings and the novelty thereof pointed out in the appended claims.

BRIEF DESCRIPTION OF THE DRAWINGS

FIG. 3 is a table showing the details of code conversion;

DETAILED DESCRIPTION OF PREFERRED EMBODIMENTS OF THE INVENTION

Figure 1:
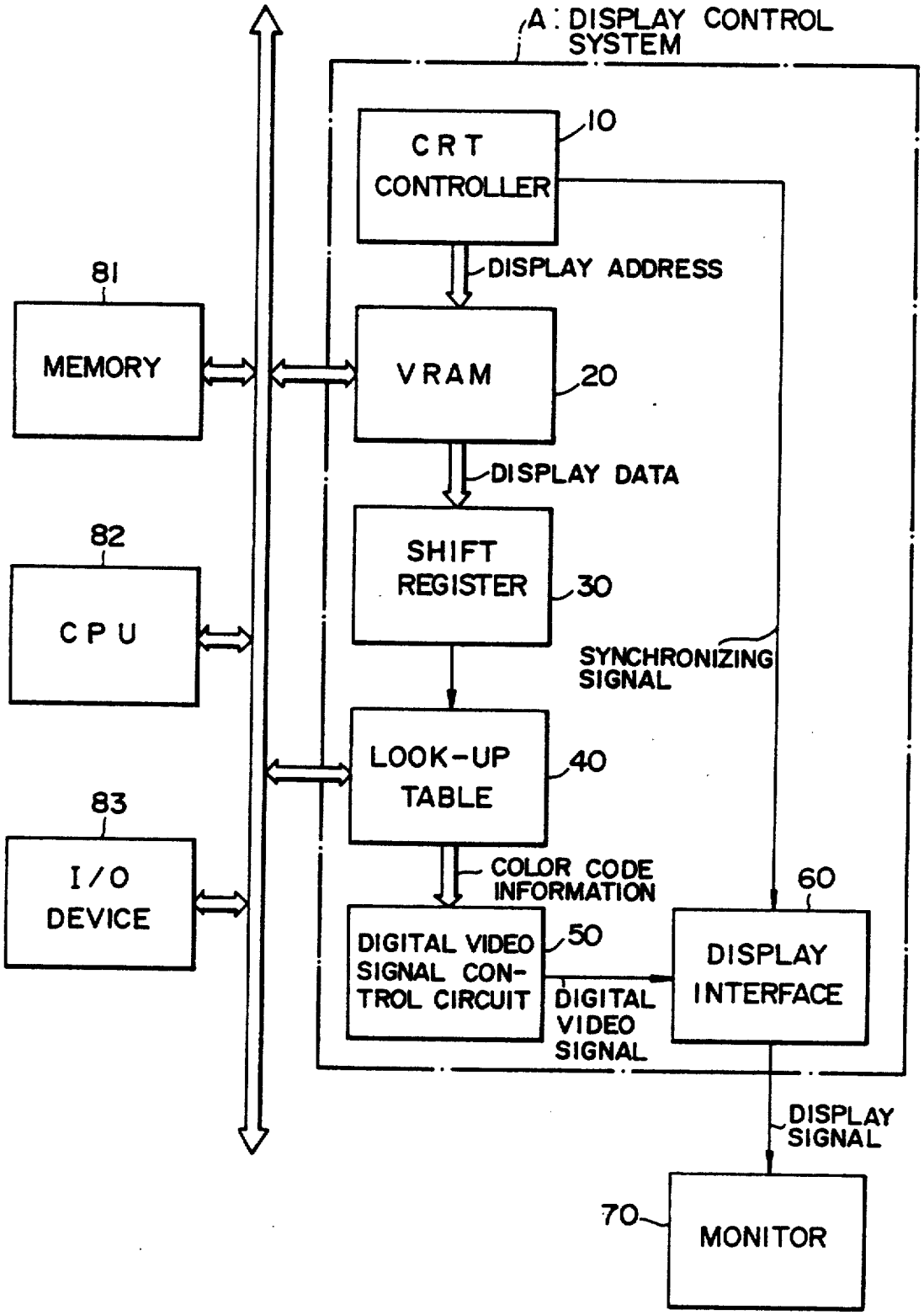
FIG. 1 is a block diagram showing a first embodiment of the invention.

Referring first to FIG. 1, there is shown a block diagram of a first embodiment according to the invention, in which a display control system A comprises a CRT controller 10, a VRAM (video RAM) 20, a shift register 30, a look-up table 40, a digital video signal control circuit 50, and a display interface 60.

CRT Controller 10 controls the whole display control system A.

VRAM 20 writes display data under control of CPU 82 and also reads out the data to be displayed on a display device according to demand.

Shift Register 30 converts parallel display data read out from VRAM 20 into serial signals.

Look-up Table 40 converts the display data read out from VRAM 20 as color codes (logical color codes) into color code information or color codes (physical color codes) to be actually displayed.

Digital Video Signal Control Circuit 50 is a circuit that is adapted to, based on the color code information, output digital video signals corresponding to the frames (display screens) and positions thereof in a given region of the display screen.

Display Interface 60 combines the above-mentioned digital video signal with a synchronizing signal, to produce, a display signal, and then transmits the display signal to a monitor 70.

Memory 81 and I/O Device 83 are illustrated in FIG. 1 and may be ones of such devices that are conventionally employed.

Figure 2:
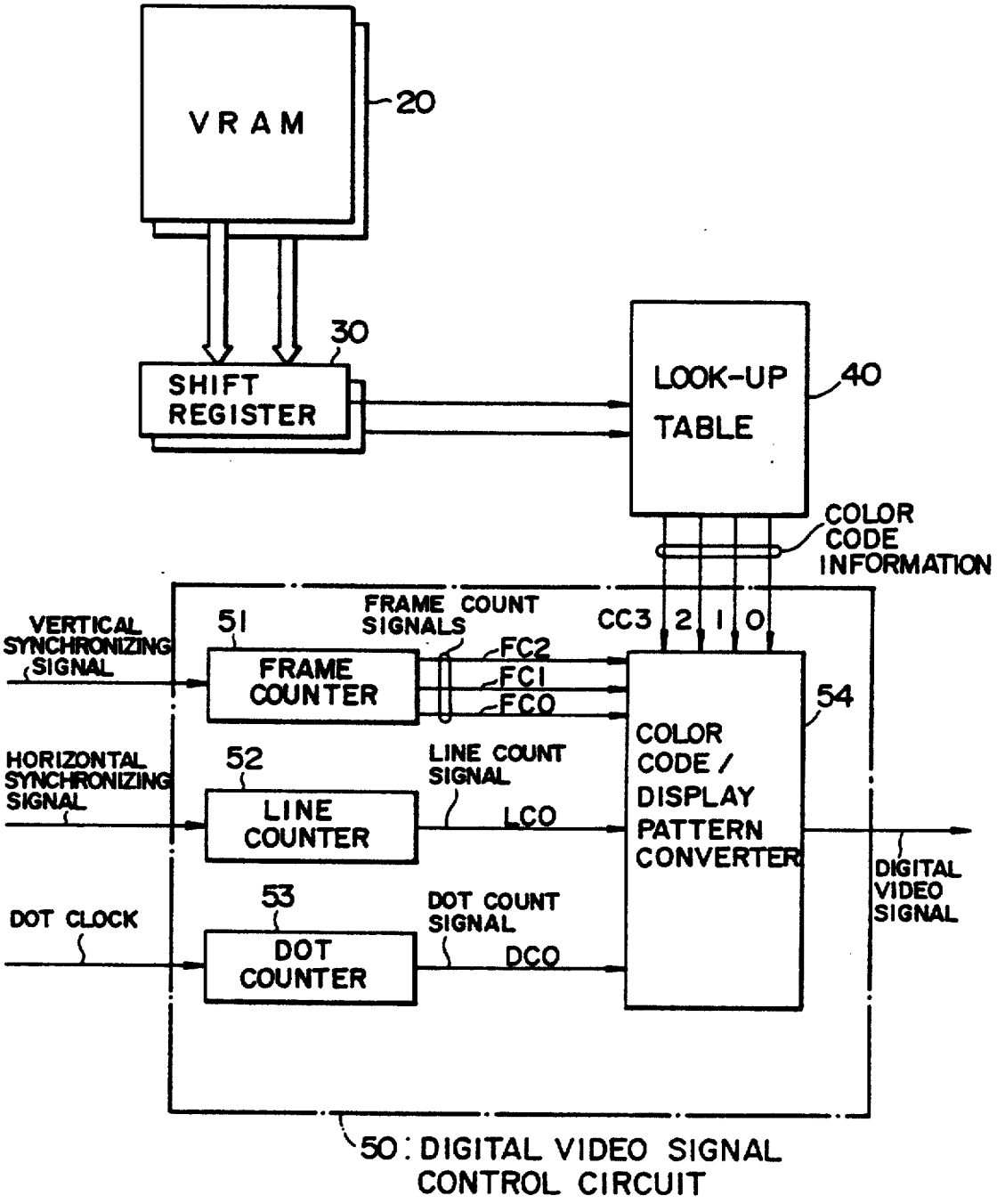
FIG. 2 is a block diagram showing the details of main portions of the first embodiment of the invention.

Referring now to FIG. 2, there is shown an embodiment of Digital Video Signal Control Circuit 50 in a block diagram form.

Digital Video Signal Control Circuit 50 comprises a frame counter 51, a line counter 52, a dot counter 53, and a color code/display pattern converter 54.

Frame Counter 51 is adapted to output 3-bit frame count signals FC 2~0 based on vertical synchronizing signals. The frame count signal is a signal to distinguish or select one frame out of 7 frames. Line Counter 52 outputs a 1-bit line count signal LC 0 in accordance with a horizontal synchronizing signal. Line Count Signal LC 0 is a signal to distinguish the positions of even/odd lines. Dot Counter 53 outputs a 1-bit count signal DC 0 in accordance with a dot clock, which signal DC 0 is used to distinguish the positions of even or odd dots.

Color Code/Display Pattern Converter 54 outputs a digital video signal bit by bit in accordance with 4 bits of color code information CC 4~0, Frame Count Signals FC 2~0, Line Count Signal LC 0 and Dot Count Signal DC 0, so that a predetermined display pattern is created.

FIG. 3 shows a typical code conversion table, showing the operation of Color Code/Display Pattern Converter 54. That is, this table shows relationships among Color Code Information CC 4~0, Frame Count Signals FC 2~0, Line Signal LC 0 and Dot Count Signal DC 0 when they are combined.

Next, the operation of the above-mentioned first embodiment of the invention will be described.

At first, when displaying on Monitor 70, CPU 82 writes a given piece of data into VRAM 20. CRT Controller provides a display address to VRAM 20. The display data that corresponds to the display address is then converted to a serial signal by Shift Register 30.

The serial signal is in turn converted by Look-up Table 40 into 4 bits of Color Code Information CC 3~0.

Then, the above-mentioned color code information CC 3~0 is converted to a display unit having a size of a display pattern having an area of 2 dots×2 lines. The display pattern is displayed repeatedly at a cycle or period of 8 frames, or, Frames 0~7.

Although the display pattern is illustrated in FIG. 3 with the repeated portion thereof being omitted, the number of cycles of the frames can be immediately determined.

For example, for the color code information 1, in an even line position (a position of Line Count 0) and in an even dot position (a position of Dot Count 0), a given dot is sequentially displayed as "0 0 0 0 0 0 1", while advancing from From 0 to Frame 7. In this case, "1" stands for white and "0" stands for black, (although they may be reversed). In the above case, since white is in the ratio of ⅛ to black, ⅛ is stated in the display pattern column of FIG. 3.

Also, for the same color code information as mentioned above, in an even line position (a position of Line Count 0) and in an odd dot position (a position of Dot Count 1), a given dot displayed in "0 0 0 1 0 0 0 0", while advancing from Frame 0 to 7. Further, for the same color code information, in an odd line position (a position of Line Count 1) and in an even dot position (a position of Dot Count 0), a given dot is displayed in "0 0 0 1 0 0 0 0", while advancing from Frame 0 to 7. Furthermore, for the same color code information, in an odd line position (a position of Line Count 1) and in an odd dot position (a position of Dot Count 1), a given dot is displayed in "0 0 0 0 0 0 0 1", while advancing from Frame 0 to 7.

For the above-mentioned color code information 1, a grey scale display having 8 gradations is obtained.

Similarly, two other pieces of color code information 3 and 5 have such a long cycle of repetition as mentioned above. That is, each of them has an 8-frame repetition cycle. The above-mentioned three pieces of color code information to be displayed at a long cycle of repetition are suitable for use in a display system which has a relatively long time of afterglow.

Also, each of the color code information 0, 7~C has a repetition cycle of 1 frame. Thus, in this case, even if the frame is varied, the display in the same dot remains unchanged and has a very short cycle. For the color code information 4, D~F, a repetition cycle of 2 frames is provided and two display units are repeatedly displayed. In case of the color code information 4, a so-called checkered pattern is created. The above-mentioned pieces of color code information 0, 4, 7~F having relatively shorter display repetition cycles are suited for use in a display system which has a comparatively shorter time of afterglow.

When displaying half tone image, a ratio of display of 1 and 0 may be changed for each frame. In this instance, it should be noted that if 1 and 0 are changed simultaneously for every dot within an area of 2 dots×2 lines (an area of 4 dots), then the change is in phase with the display position, to thereby produce large flickers.

Figure 4:
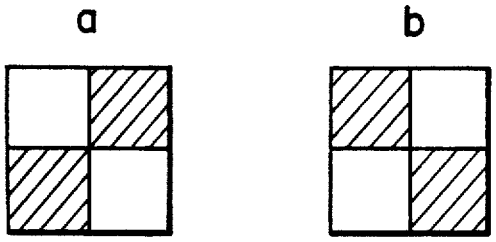
FIG. 4 is a view showing an example of display patterns employed in the invention.

In order to avoid this problem, in the above-mentioned embodiment of the invention, the display flickers are carried out separately for every dot to be 180° out-of-phase relative to an adjacent dot position, thereby decreasing the flickers in size. For example, a pattern shown in FIG. 4*a* and a pattern of FIG. 4*b* are displayed alternately, whereby a half-brightness display with no flickers thereon can be realized on a single-color display screen.

Although the above-mentioned embodiments has been described provided that one unit is composed of an area of 2 dots×2 lines, the display may be performed in display units, each unit comprising an area of 1×n, m×1, m×n (where m, n are respectively integers). To enlarge the above area, it is necessary to increase the bit numbers of both dot count signals and line count signals.

The enlarged area permits use of a arbitrary hatch patterns. However, when the area is increased to an excessive extent, it is difficult to distinguish the coloring of smaller areas.

In the above-mentioned embodiment, since VRAM 20 has two planes, four colors can be displayed Thus four colors are selected by Look-up Table 40, thereby supplying the color code information to Color Code/-Display Pattern Converter 54. In this way, Look-up Table 40 can be operated to select uses suitable for the display device to be used in terms of software. Therefore, the above-mentioned embodiment is preferable in view of the flexibility of the display control system.

Further, the number of repetition frames may be more than 8 or may be limited to 4 or less. Other pattern arrangements than those in the above embodiment may be employed. The line count signals and dot count signals may be input from CRT Controller 10. Look-up Table 40 may be omitted.

Figure 5:
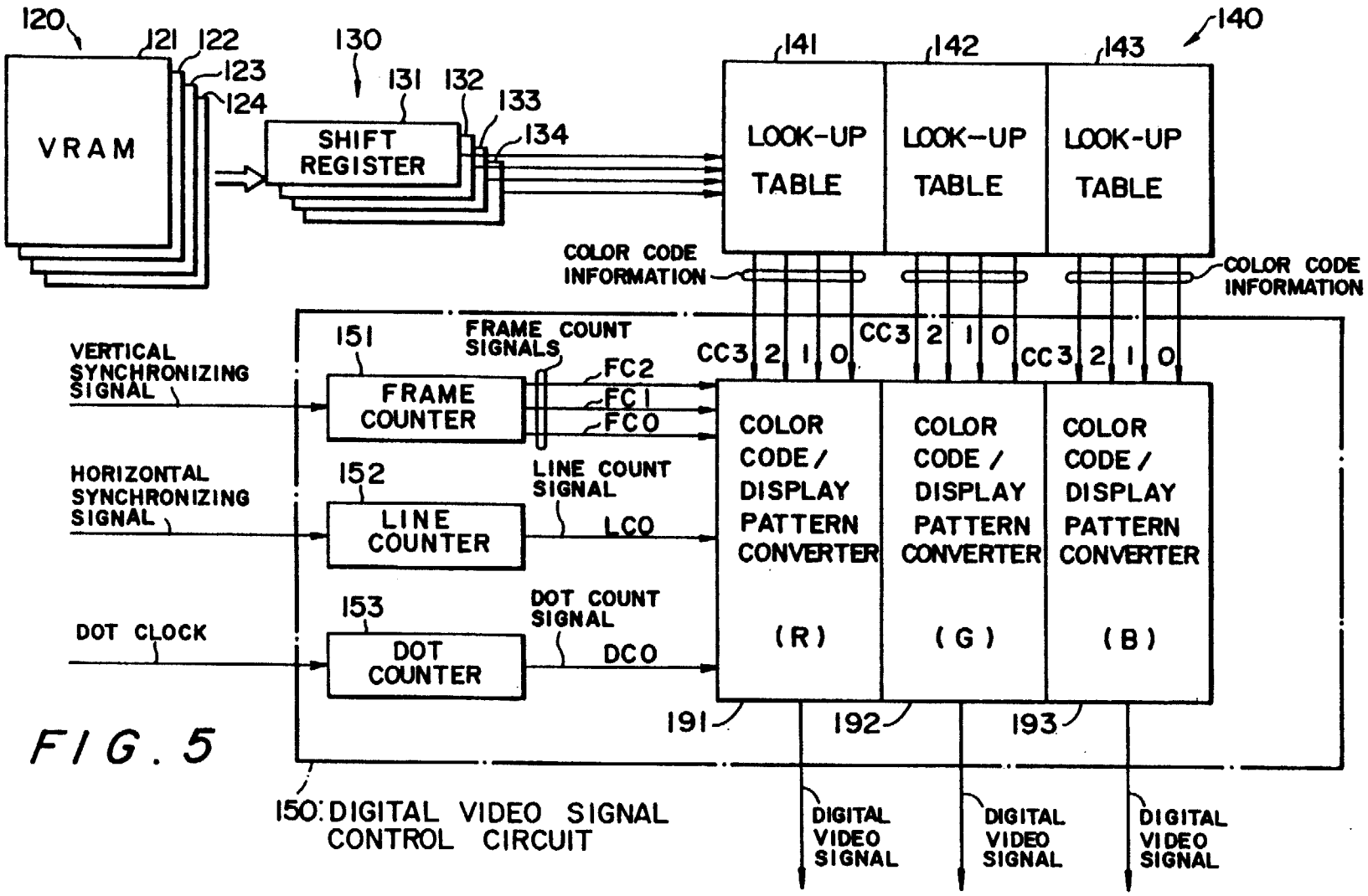
FIG. 5 is a block diagram showing the details of main portions of the second embodiment of the invention.

FIG. 5 shows a black diagram of a second embodiment of the invention.

The second embodiment shown in FIG. 5 is a partially modified version of the first embodiment shown in FIG. 2. In this second embodiment, VRAM 120, Shift Register 130, Look-up Table 140 and Digital Video Signal Control Circuit 150 are employed in place of VRAM 20, Shift Register 30, Look-up Table 40 and Digital Video Signal Control Circuit 50, respectively.

VRAM 120 consists of four RAMs 121, 122, 124, and Shift Register 130 includes four shift registers 131, 132, 133, and 134. The above-mentioned four RAMs 121~124 and four Shift Resiters 131~134 are all necessary to generate 16 colors. Also, Look-up Table 140 is composed of three look-up tables 141, 142, 143.

Digital Video Signal Control Circuit 150 comprises a frame counter 151, a line counter 152, a dot counter 153 and three color code/display pattern converters 191, 192, 193.

Frame Counter 151, Line Counter 152 and Dot Counter 153 are identical with Frame Counter 51, Line Counter 52, and Dot Counter 53, respectively.

Color Code/Display Pattern Converter 191 outputs digital video signals bit by bit to create a given display pattern, in accordance with 4 bits of color code information CC 3~0, frame count signals FC 2~0, line count signal LC 0 and dot count signal DC 0. The above-mentioned given display pattern is illustrated and will be described later.

Color Code/Display Pattern Converters 192, 193 also receive signals similar to those in Color Code/Display Pattern Converter 191 from Frame Counter 151, Line Counter 152 and Dot Counter 153. However, Color Code/Display Pattern Converters 191, 192, 193 receive the color code information CC 3~0 from Look-up Table 141, 142, 143, respectively. Also, Color Code/Display Pattern Converters 191, 192, 193 output the digital video signals for red (R), green (G), and blue (B), respectively.

The Monitor is assumed to be a color monitor to which three digital signals are input.

The digital video signals that are output from the respective color code display/pattern converters 191~193 have various kinds of gradation, with the result that colors displayed on the screen by means of these three digital video signals are quite near to natural colors.

Figure 6:
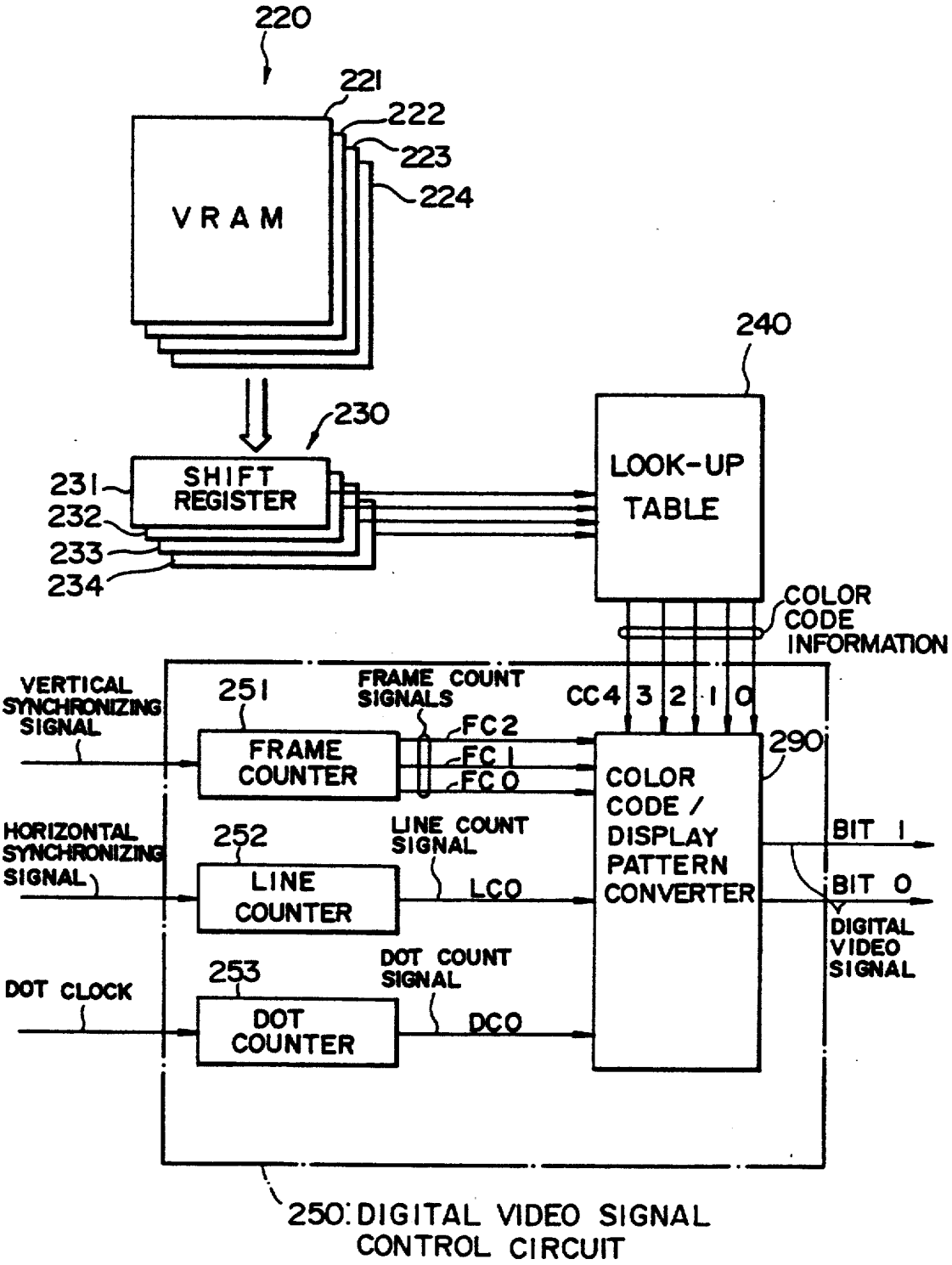
FIG. 6 is a block diagram showing the details of main portions of the third embodiment of the invention; and, FIGS. 7(1) and (2) are tables respectively showing the details of code conversion in the third embodiment of the invention.

FIG. 6 shows a block diagram of a third embodiment of the invention, which is a partially modified version of the first embodiment shown in FIG. 2. In this third embodiment, VRAM 220, Shift Register 230, Look-up Table 240 and Digital Video Signal Control Circuit 250 are employed in place of VRAM 20, Shift Register 30, Look-up Table 40 and Digital Video Signal Control Circuit 250, respectively.

VRAM 220 includes four planes, that is, RAMs 221, 222, 223, 224, while Shift Register 230 has four shift registers 231, 232, 233, 234. Look-up Table 240 is adapted to output 5 bits of color code information CC 4~0 in accordance with 4-bit signals.

Color Code/Display Pattern Converter 290, in accordance with 5 bits of color code information CC 4~0, frame count signal FC 2~0, line count signal LC 0 and dot count signal DC 0, outputs 2 bits of digital video signals so as to create given display patterns. Such given display patterns are illustrated in FIGS. 7(1) and (2).

FIGS. 7(1) and (2) illustrate examples of code conversion tables employed in the above second embodiment. These figures shown the operation of Color Code/Display Pattern Converter 290. Specifically, there is illustrated the relationship among Color Code Information CC 4~0, Frame Count Signals FC 2~0, Line Count Signal LC 0, Dot Count Signal DC 0, and 2-bit digital video signals output in accordance with the above mentioned information and signals.

The signals shown in FIGS. 7(1) and (2) are the output signals of the bit "0" of Color Code/Display Pattern Converter 290, while the output signals of the bit "1" of Converter 290 are high-intensity-brightness signals.

The operation of the above-mentioned embodiment of the invention will now be described.

At first, the Monitor is assumed to be a monochrome monitor which is capable of displaying video signals and high-intensity brightness signals. When displaying Monitor 270, CPU 282 writes a given piece of display data into VRAM 220. CRT Controller 210 gives a display address to VRAM 220. Then, display data corresponding to the display address is converted to a serial signal by Shift Register 230 and is further converted to 5 bits of color code information CC 4~0 by Look-up Table 240.

Then, the above-mentioned 5 pieces of color code information CC 4~0 are converted to display patterns in display units, each unit consisting of an area of 2 dots×2 lines. The display patterns are displayed repeatedly at a cycle of 8 frames, namely, Frames 0~7.

The above-mentioned description as to FIG. 7(1) is basically similar to the description relating to FIG. 3 and also applies similarly in case of FIG. 7(2) as well.

The output signals of Color Code Information 11~1F in FIG. 7(2) can be obtained by changing the output signal "0" of Color Code Information 00~0F in FIG. 7(1) into "1" and the output signal thereof "1" into "3".

In this manner, the digital video signals output from Color Code/Display Pattern Converter 290 have various gradations, permitting display of more gradations.

What is claimed is:

1. A display control system which uses a single frame of color code information to display a plurality of frames of gray-scale information on pixel positions of a monochrome display screen, comprising:

means for receiving a single pixel of color code information for a pixel of said display screen; and digital video signal control means, responsive to said pixel color code information, for producing a plurality of monochrome digital video signals for each color pixel of the video image, said plurality being indicative of a color with a gray scale value dependent on said color code information, the value of said monochrome digital video signal being based on both of (a) which of said frames of gray scale information is being displayed and (b) said pixel position.

2. The display control system as set forth in claim 1, further comprising a dot counter, a frame counter and a line counter for storing a count indicative of an address of said pixel position and a number of said gray scale frame, and wherein said digital video signal control means receives output signals of said dot counter, said line counter and said frame counter.

3. The display control system as set forth in claim 2, wherein said gray scale frames vary at a predetermined cycle, said cycle being short enough to prevent any flickers from being produced.

4. The display control system as set forth in claim 2, wherein said gray scale frames vary such that any flickers which are produced have phases such to cancel out one another.

5. The display control system as set forth in claim 1, further comprising a look-up table, wherein said digital video signal control means includes means for selecting the pixel patterns in accordance with said look-up table.

6. A display control system which uses a single frame of color code information to display a plurality of frames of gray scale information on pixel positions of a [monochrome] display screen, comprising:

means for receiving a pixel of color code information for a pixel of said display screen;

means for determining a dot position on said display screen, and a current gray scale frame count indicative of which of a plurality of frames of gray scale information is being displayed; and a plurality of digital video signal conversion means, each for converting each said pixel of color code information into a plurality of monochrome digital video signals, said plurality being indicative of a color with a gray scale value dependent on said color code information, the value of said monochrome digital video signals being based on both of said gray scale frame count, and said dot position on said display screen.

7. The display control system as set forth in claim 6, further comprising a dot counter, a frame counter and a line counter for storing a count indicative of an address to specify said dot position and said gray scale frame count, and wherein each of said digital video signal conversion means receives output signals of said dot counter, said line counter and said frame counter.

8. The display control system as set forth in claim 7, wherein said gray scale frames vary such that any flickers which are produced have phases that cancel each other.

9. The display control system as set forth in claim 8, further comprising a look-up table, and wherein said digital video signal conversion means are respectively adapted to select pixel patterns, in accordance with said look-up table.

10. The display control system as set forth in claim 6, further comprising a look-up table wherein said digital video signal conversion means includes means for selecting pixel patterns, in accordance with said look-up table.

11. The display control system as set forth in claim 6, wherein there are provided three of said digital video signal conversion means, one each for red, for green, and for blue, respectively.

12. The display control system as set forth in claim 6, wherein there are provided three of said digital video signal conversion means, respectively for red, for green, and for blue.

13. A display control system which uses a single frame of color code information to display a plurality of frames of gray scale information on a monochrome display screen having a plurality of pixel positions comprising:

digital video signal conversion means for converting a single pixel of color code information into a plurality of monochrome digital video signals, each for a frame of the video image, said plurality being indicative of a color with a gray scale value dependant on said color code information, the value of said monochrome digital video signals being based on a gray scale frame count, indicative of which frame of gray scale information is being displayed and a count of said pixel positions on said display screen, such that at least some video signals indicative of a first color code and a first pixel position in a first gray scale frame, are different video signals from signals for said first color code and said same first pixel position in a second gray scale frame; and means for outputting said digital video signals as a plurality of bits.

14. The display control system as set forth in claim 13, further comprising a dot counter, a frame counter and a line counter for maintaining a count of an address on said screen and of said gray scale frame count, and wherein said digital video signal conversion means is connected to receive output signals of said dot counter, said line counter and of said frame counter.

15. The display control system as set forth in claim 14, wherein said gray scale frames vary such that any flickers which are produced have phases which cancel each other.

16. The display control system as set forth in claim 13, wherein said digital video signal conversion means includes a look-up table, and is adapted to select pixel patterns in accordance with said look-up table.

17. A display control system which uses a single frame of color code information to display a plurality of frames of gray scale information on pixel positions of a monochrome display screen, comprising:

means for receiving a color code for a pixel of said display screen;

means for determining a plurality of monochrome digital video signals for each said color code of each said pixel, said plurality being indicative of a color with a gray scale value dependent on said color code, and each of said plurality of signals indicative of a different one of said gray scale frames, the value of said video signals being based on a line and pixel count and a frame number; and means for supplying said digital video signals to said display screen.

18. A system as in claim 17 further comprising:

a dot counter coupled to said look-up table means for producing a first output when a dot is an even numbered dot and a second output when a dot is an odd numbered dot;

a fine counter coupled to said look-up table means for producing a first output when said line is an even numbered line and a second output when said line is an odd numbered line; and a gray scale frame counter for producing an output indicative of which of a plurality of gray scale frames of said image is being displayed.

wherein said determining means includes means for determining said digital video signals based on said color code and said outputs of said dot counter, said line counter and said gray scale frame counter.

19. A system as in claim 18 further comprising varying means for reading varying display patterns for each of said frames such that any flickering of said display patterns have phases which cancel with one another.

* * * * *